Dec. 3, 1968 G. E. FRAGER ETAL 3,414,252
FARM IMPLEMENT HAVING ELASTOMER MOUNTING
Filed May 3, 1966
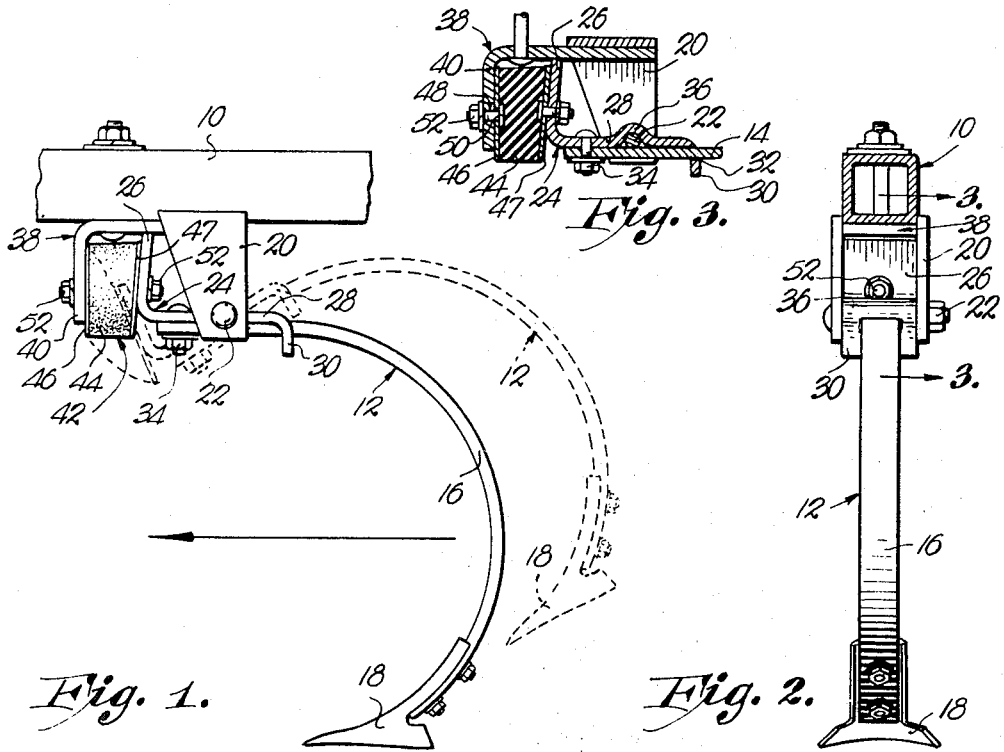
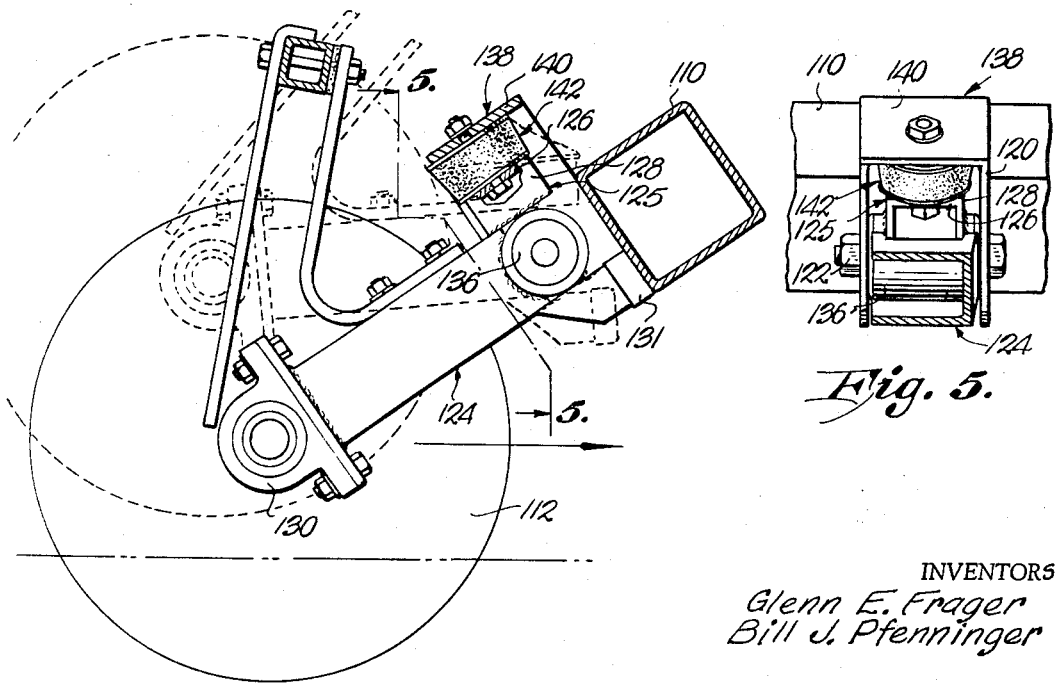
INVENTORS
Glenn E. Frager
Bill J. Pfenninger
BY Hovey, Schmidt, Johnson & Hovey
ATTORNEYS United States Patent Office 3,414,252
Patented Dec. 3, 1968

3,414,252
FARM IMPLEMENT HAVING ELASTOMER MOUNTING
Glenn E. Frager and Bill J. Pfenninger, Hutchinson, Kans., assignors to Krause Corporation Inc., Hutchinson, Kans., a corporation of Kansas
Filed May 3, 1966, Ser. No. 547,249
3 Claims. (Cl. 267—1)

ABSTRACT OF THE DISCLOSURE

A tool mount for a farm implement comprising a pivoted tool carrier provided with a plate on one end and between the pivot point and a plate on the implement frame. An elastomer between the plates is secured to each plate respectively and swinging of the tool carrier imparts deformation stresses of shear, tension and compression in the elastomer whereby the elastomer yieldably resists said swinging movement.

This invention relates to a spring structure for a farm implement and has as its primary object the efficient utilization of rubber as a biasing means for yieldably urging a farm tool downwardly for normal travel in a working position, while permitting upward swinging of the tool when obstacles are encountered thereby. Various spring arrangements have been attempted for biasing earth-working tools for such operation, but no implement has heretofore effectively employed rubber or similar material having elastomer properties to provide the biasing action. Elastomer spring means is preferred over metal spring mechanisms because of the inherent durability and noncorrosive characteristics of elastomer material.

Accordingly, it is an important object of the present invention to provide a spring structure for use with a swingable tool wherein a rubber-like body is employed for biasing the tool, the latter cooperating with the body to place corresponding zones of the body in compression and tension when the tool is swung upwardly. This novel combination of pressure application on the body permits ready swinging of the tool through a relatively large arc with the yielding resistance of the body being substantially uniform throughout the arc.

In the drawing:

FIGURE 1 is a fragmentary, side elevational view of a spring structure made pursuant to the teachings of our invention and showing the same mounted on an implement frame and carrying a tool;

FIG. 2 is a rear elevational view thereof, the frame being shown in section;

FIG. 3 is a cross-sectional view taken along line 3—3 of FIG. 2.

FIG. 4 is a side elevational view of a second form of the invention, parts thereof being broken away and shown in section to reveal details of construction; and FIG. 5 is a cross-sectional view taken along line 5—5 of FIG. 4.

In the first form of the invention, shown in FIGS 1–3, the spring structure is mounted on a bar 10 of a farm implement frame and carries a tool 12 having an upper horizontal stretch 14, a downwardly extending, arcuate shank 16, and a sweep 18 bolted to the lowermost end of shank 16. A pair of parallel legs 20 depend from the opposed sides of bar 10 and have a hinge pin 22 interconnecting the lower ends thereof.

A carrier, broadly designated 24, includes a vertical pusher 26 having a laterally extending plate 28, the latter having an extension 30 projecting downwardly from the rearmost end thereof. An opening 32 is formed in extension 30 for receiving stretch 14 of tool 12, the outer end of stretch 14 being bolted to plate 28 by bolt and nut means 34 adjacent pusher 26. A dimple 36 is formed in plate 28 between bolt 34 and extension 30 and is journaled over pin 22 to swingably mount tool 12 between legs 20.

An L-shaped bracket 38 is bolted by one leg to bar 10 and the other leg thereof extends downwardly to present an abutment 40 which is disposed in opposed, spaced relationship to pusher 26 of carrier 24. The spring structure of the invention comprises a sandwich unit 42 having a cylindrical, solid elastomer body 44 spanning the distance between a pair of outer, circular plate elements 46 and 47 which are bonded to the opposed faces of body 44. Abutment 40 and pusher 26 are provided with corresponding threaded studs 48, each of the latter having a nut 50 at the outer end thereof and extending through a respective element to terminate in a head 52 for interconnecting the sandwich unit 42 between abutment 40 and pusher 26. Abutment 40 thus rigidly supports element 46 while element 47 is swingable with pusher 26.

The opposed faces of body 44 are initially parallel, but the weight of tool 12 causes a slight compression in the lower half of body 44 to present an initially tapered member as is clear in FIGS. 1 and 3. In operation, sweep 18 is moved forwardly beneath the ground in the direction indicated by the arrow in FIG. 1, and body 44 is sufficiently strong to resist upward swinging of tool 12 under normal working conditions. However, if an obstacle, such as a rock, is encountered by sweep 18, tool 12 will swing upwardly to clear the obstacle and body 44 will yield and deform as pushed 26 is swung toward abutment 40. Initially, element 47 swings into parallelism with element 46 and then the upper portion of element 47 swings downwardly toward rigid element 46 to compress the adjacent upper zone of body 44, while the lower zone thereof is simultaneously placed in tension by the lower portion of element 47 which is drawn downwardly and away from rigid element 46. The working position of tool 12 is shown in the solid line portion of FIG. 1, and an upper, clearing position is shown in dashed lines.

The combination compression and tension application of pressure on body 44 provides a uniform resistance to tool swinging throughout the arc of movement of tool 12, to the end that tool 12 may rise to a relatively high position to clear large obstacles and thereby substantially preclude breakage of the tool. This action is to be contrasted with a body being only compressed wherein each stage of compression is more difficult since there is no corresponding relief as provided by the instant compression-tension device. It will be appreciated from viewing FIG. 1 that the initially rectangular cross section of body 44 is deformed into a substantially triangular configuration upon sufficient swinging of tool 12.

In the second form of the invention, shown in FIGS. 4 and 5, the spring structure is mounted on a bar 110 of an implement frame and is adapted to carry a disc tool 112. A U-shaped housing 138 is mounted on bar 110 and presents a pair of parallel legs 120 connected at the uppermost ends thereof by a bight or abutment 140. An arm 124 having a sleeve 136 is swingably mounted between legs 120 by a pivot bolt 122 extending through sleeve 136. A bearing block 130 is provided at the outermost end of arm 124 for rotatably carrying disc 112, and a stop 131 on arm 124 abuts bar 110 to limit downward travel of the arm.

A U-shaped section 125 is rigidly secured by the legs 128 thereof to arm 124 above sleeve 136 and the upper pusher face 126 thereof is disposed in opposed, spaced relationship to abutment 140. A sandwich unit 142, similar in all respects to sandwich 42 discussed above, is disposed and bolted between abutment 140 and lateral section 125 to resiliently urge disc 112 into ground-engaging relationship. Disc 112 is caused to travel in the direction of the arrow in FIG. 4. and upon striking an obstacle, it will swing upwardly to act through pusher 126 to deform the elastomer body of sandwich unit 142 as shown in the dashed line portions of FIG. 4. The compression and tension actions within the elastomer body, and the uniform pressure characteristics thereof, are identical to the first described form of the invention. Thus, it is seen that our novel invention may be employed in various forms to accomplish the desired results.

Having thus described the invention, what is claimed as new and desired to be secured by Letters Patent is:

1. In a farm implement provided with a frame having a first plate, a tool mount comprising:
   a tool carrier having a second plate spaced from the first plate;
   an elastomer secured to said plates therebetween; and
   pivot means for attaching the carrier to the frame for swinging movement relative to the frame, the second plate being between said pivot means and the first plate for applying a shearing stress to the elastomer as the carrier is swung in one direction to move one part of the second plate toward the first plate compressing a first portion of the elastomer and to move a second part of the second plate away from the first plate placing a second portion of the elastomer under tension.

2. The invention of claim 1, wherein said second plate is parallel to the axis of swinging movement of the carrier about said pivot means.

3. The invention of claim 2, wherein said second plate moves into and out of parallelism with said first plate during swinging of said carrier.

References Cited

UNITED STATES PATENTS

| | | | |
|---|---|---|---|
| 242,111 | 5/1881 | Carter | 172—711 |
| 1,735,982 | 11/1929 | Short | 248—358 X |
| 1,871,921 | 8/1932 | Short | 267—30 |
| 2,580,975 | 1/1952 | Tea | 267—30 X |
| 2,724,586 | 11/1955 | Malmquist | 267—1 |
| 2,906,353 | 9/1959 | Rogers | 172—711 X |
| 2,969,656 | 1/1961 | Reuter | 267—63 X |

FOREIGN PATENTS

| | | |
|---|---|---|
| 77,148 | 12/1961 | France. |
| 85,372 | 1/1936 | Sweden. |

ARTHUR L. LA POINT, *Primary Examiner.*

STANLEY T. KRAWCZEWICZ, *Assistant Examiner.*